US012723810B2

(12) United States Patent
Chen et al.

(10) Patent No.: US 12,723,810 B2
(45) Date of Patent: Sep. 1, 2026

(54) AIR NOZZLE, OVEN, AND COATING SYSTEM

(71) Applicant: CONTEMPORARY AMPEREX TECHNOLOGY (HONG KONG) LIMITED, Hong Kong (CN)

(72) Inventors: Mengqi Chen, Ningde (CN); Shengdong Chen, Ningde (CN); Lei Song, Ningde (CN); Wei Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 598 days.

(21) Appl. No.: 18/343,088

(22) Filed: Jun. 28, 2023

(65) Prior Publication Data

US 2024/0230228 A1 Jul. 11, 2024

Related U.S. Application Data

(63) Continuation of application No. PCT/CN2023/084440, filed on Mar. 28, 2023.

(30) Foreign Application Priority Data

Jan. 5, 2023 (CN) ......................... 202320023809.0

(51) Int. Cl.
*F26B 21/50* (2026.01)
*F26B 3/04* (2006.01)
*F26B 21/37* (2026.01)

(52) U.S. Cl.
CPC ................ *F26B 21/50* (2026.01); *F26B 3/04* (2013.01); *F26B 21/37* (2026.01)

(58) Field of Classification Search
CPC .. F26B 21/50; F26B 3/04; F26B 21/37; F26B 21/00; F26B 21/55
See application file for complete search history.

(56) References Cited

U.S. PATENT DOCUMENTS 4,837,947 A * 6/1989 Krieger .................. B65H 23/24 242/615.11
5,395,029 A * 3/1995 Kurie .................... F26B 13/104 226/7

FOREIGN PATENT DOCUMENTS

CN 202382540 U 8/2012
CN 207570260 U 7/2018
(Continued)

OTHER PUBLICATIONS

Translation, CN217017273 U, Jul. 22, 2022 (Year: 2022).*
(Continued)

*Primary Examiner* — Jessica Yuen
(74) *Attorney, Agent, or Firm* — Ladas & Parry LLP

(57) ABSTRACT

An air nozzle includes a housing and an airflow regulation apparatus. The housing includes a target air outlet and an air inlet. Air flow enters the housing through the air inlet and leaves the housing through the target air outlet. The airflow regulation apparatus is located at the target air outlet and is capable of moving between a first position and a second position. The airflow regulation apparatus exerts a greater resistance against the air flow in the first position than it exerts against the air flow in the second position. When the airflow needs to be reduced, the airflow regulation apparatus is regulated to the first position to increase the resistance against the air flow at the target air outlet. When the airflow needs to be increased, the airflow regulation apparatus is regulated to the second position to reduce the resistance against the air flow at the target air outlet.

12 Claims, 7 Drawing Sheets

(56) References Cited

FOREIGN PATENT DOCUMENTS

| | | | |
|---|---|---|---|
| CN | 113426648 | A | 9/2021 |
| CN | 214917802 | U | 11/2021 |
| CN | 215141756 | U | 12/2021 |
| CN | 215864349 | U | 2/2022 |
| CN | 217017273 | U | 7/2022 |
| CN | 217747927 | U | 11/2022 |
| CN | 218309059 | U | 1/2023 |

OTHER PUBLICATIONS

International Search Report for International Application PCT/CN2023/084440, dated Aug. 15, 2023.
Written Opinion of International Search Authority for International Application PCT/CN2023/084440, dated Aug. 15, 2023.
Notice of registration procedures for CN utility model application No. 202320023809.0, dated Apr. 15, 2023.
Extended European search report for EP application No. 23731081.8, dated Sep. 27, 2024.

* cited by examiner

AIR NOZZLE, OVEN, AND COATING SYSTEM

CROSS-REFERENCE TO RELATED APPLICATIONS

This application is a continuation of International Patent Application No. PCT/CN2023/084440, filed on Mar. 28, 2023, which claims priority to Chinese Patent Application No. 202320023809.0, filed on Jan. 5, 2023. The aforementioned patent applications are incorporated herein by reference in their entirety.

TECHNICAL FIELD

This application relates to the field of battery technologies, and in particular, to an air nozzle, an oven, and a coating system.

BACKGROUND

Energy saving and emission reduction are crucial to the sustainable development of the automotive industry. Electric vehicles, with their advantages in energy conservation and emission reduction, have become an important part of sustainable development of the automobile industry. For electric vehicles, battery technology is an important factor in connection with their development.

Electrode plates are important components of a battery. When an electrode plate has been coated, the slurry applied on the electrode plate needs to be dried. In the related technologies, the drying speed varies in two sides and the middle part of the electrode plate, affecting quality of the electrode plate.

SUMMARY

This application is intended to resolve at least one of the technical problems in the prior art. In view of this, an object of this application is to provide an air nozzle, an oven, and a coating system to alleviate the problem of inconsistent drying speeds in the oven.

Embodiments of a first aspect of this application provide an air nozzle including: a housing including a target air outlet and an air inlet, where air flow enters the housing through the air inlet and leaves the housing through the target air outlet, and an airflow regulation apparatus located at the target air outlet and is capable of moving between at least a first position and a second position, where the airflow regulation apparatus exerts a greater resistance against the air flow in the first position than the airflow regulation apparatus exerts against the air flow in the second position.

In the technical solution of this embodiment of this application, when the airflow at the target air outlet needs to be reduced, the airflow regulation apparatus is regulated to the first position to increase the resistance against the air flow at the target air outlet, thereby reducing the airflow at the target air outlet. When the airflow at the target air outlet needs to be increased, the airflow regulation apparatus is regulated to the second position to reduce the resistance against the air flow at the target air outlet, thereby increasing the airflow at the target air outlet. When the air nozzle provided in this embodiment of this application is used as the exhaust air nozzle in the oven, the target air outlet is aligned to the two sides of the electrode plate, and the airflow regulation apparatus is regulated to the first position, thereby reducing the airflow on the two sides of the electrode plate. This can balance the drying speeds on both sides of the electrode plate and in the middle part of the electrode plate, alleviating the problem of inconsistent drying speeds and improving the quality of the electrode plate.

In some embodiments, the airflow regulation apparatus includes: a rotating rod rotatably connected to the housing; and a blade located at the target air outlet, where the blade is connected to the rotating rod, and the rotating rod is able to drive the blade to rotate. When the rotating rod rotates, it drives the blades to rotate, which in turn changes the area of the blade blocking the target air outlet, thereby changing the resistance exerted against the air flow and implementing airflow regulation. The airflow can be regulated simply by controlling the rotating rod to rotate, featuring simple structure and easy regulation. In addition, the rotating rod can be regulated to rotate at different angles, so that the area of the blade blocking the target air outlet varies, allowing the airflow regulation apparatus to regulate a wider range of airflow.

In some embodiments, the airflow regulation apparatus includes at least two rotating rods parallel to each other, and each of the rotating rods is connected to at least one blade. The rotating rod and the blade can be disposed based on the position of the target air outlet. In this way, even if there are multiple target air outlets, it is possible to implement airflow regulation at the multiple target air outlets.

In some embodiments, the airflow regulation apparatus includes two rotating rods, where the two rotating rods are arranged along a width direction of the housing. The air nozzle further includes a connecting rod mechanism, where two ends of the connecting rod mechanism are each fixedly connected to one rotating rod. With the connecting rod mechanism provided, the two rotating rods can be rotated simultaneously, so that only one rotating rod needs to be rotated to implement simultaneous rotation of the two rotating rods, which is more labor-saving.

In some embodiments, the air nozzle further includes: an actuation mechanism connected to the rotating rod. The actuation mechanism actuates the rotating rod to rotate, which is more labor-saving. The rotating rod can also be fastened by fastening the actuation mechanism. When the rotating rod is regulated to a specified position at which the rotating rod is unable to rotate, the rotating rod is fastened.

In some embodiments, the actuation mechanism includes: an actuator; a first connecting rod extending in a first direction, where the first connecting rod is connected to an actuating shaft of the actuator, and the first direction is parallel to an extension direction of the rotating rod; a second connecting rod extending in a second direction, where the second direction intersects with the first direction; a first steering gear connected to the first connecting rod and the second connecting rod; and a second steering gear connected to the second connecting rod and the rotating rod. The actuator actuates the first connecting rod to rotate, the first connecting rod drives, via the first steering gear, the second connecting rod to rotate, and the second connecting rod drives, via the second steering gear, the rotating rod to rotate, so that the blade rotates to regulate the airflow at the target air outlet.

In some embodiments, the rotating rod extends in a length direction of the housing, and the blade is slidably connected to the rotating rod, where a sliding direction of the blade is parallel to the length direction of the housing. The position of the blade is adjusted by sliding the blade. The position of the blade can be adjusted based on the position of the target air outlet, thus implementing airflow regulation at different target air outlets.

In some embodiments, in the length direction of the housing, the target air outlet is located at the two ends of the housing. When the air nozzle provided in the embodiment of this application is used in an oven for electrode plate, the air nozzle is arranged along the width direction of the electrode plate, and two ends of the air nozzle correspond to two sides of the electrode plate. Due to the faster drying speed on both sides of the electrode plate, the target air outlet is located at both ends of the housing, meaning that the target air outlet corresponds to both sides of the electrode plate. The airflow regulation apparatus is used to regulate the airflow at the target air outlet, so as to reduce the drying speed at the target air outlet and balance the drying speeds on both sides of the electrode plate and in the middle part of the electrode plate, thereby reducing the deviation in drying speed and improving the quality of the electrode plate.

In some embodiments, the housing includes: two side plates; two end plates respectively located at two ends of the two side plates, where the two end plates are both connected to the two side plates, and for each of the side plates, two ends of the side plate are connected to different end plates. The two side plates and the two end plates form an overall structure of the housing and are combined to form an air cavity of the housing.

In some embodiments, the end plate is trapezoidal in shape and the two side plates are respectively connected to two waists of the end plate. The end plate is arranged to be trapezoidal in shape, and the size of the target air outlet can be adjusted by adjusting the shape of the trapezoid, without changing the size of the air inlet.

In some embodiments, the air inlet is located on the two side plates. The area of the side plate is so large that a large number of air inlets can be arranged to improve the overall drying speed of the oven.

In some embodiments, both side plates are provided with multiple air inlets. For each side plate, along an arrangement direction of the two end plates, the number of air inlets in a middle part of the side plate is greater than the number of air inlets at either end of the side plate. Because the target air outlet is located at the two ends of the housing, reducing the number of air inlets at both ends of the side plate can also reduce the airflow at the target air outlet.

A second aspect of the embodiments of this application provides an oven including the air nozzle in the foregoing embodiment.

A third aspect of the embodiments of this application provides a coating system including the oven in the foregoing embodiment.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

In the accompanying drawings, unless otherwise specified, the same reference signs in multiple accompanying drawings denote the same or similar components or elements. The accompanying drawings are not necessarily drawn to scale. It should be understood that these accompanying drawings merely describe some embodiments disclosed in this application, and should not be construed as a limitation on the scope of this application. To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

DESCRIPTION OF REFERENCE SIGNS

Figure 1:
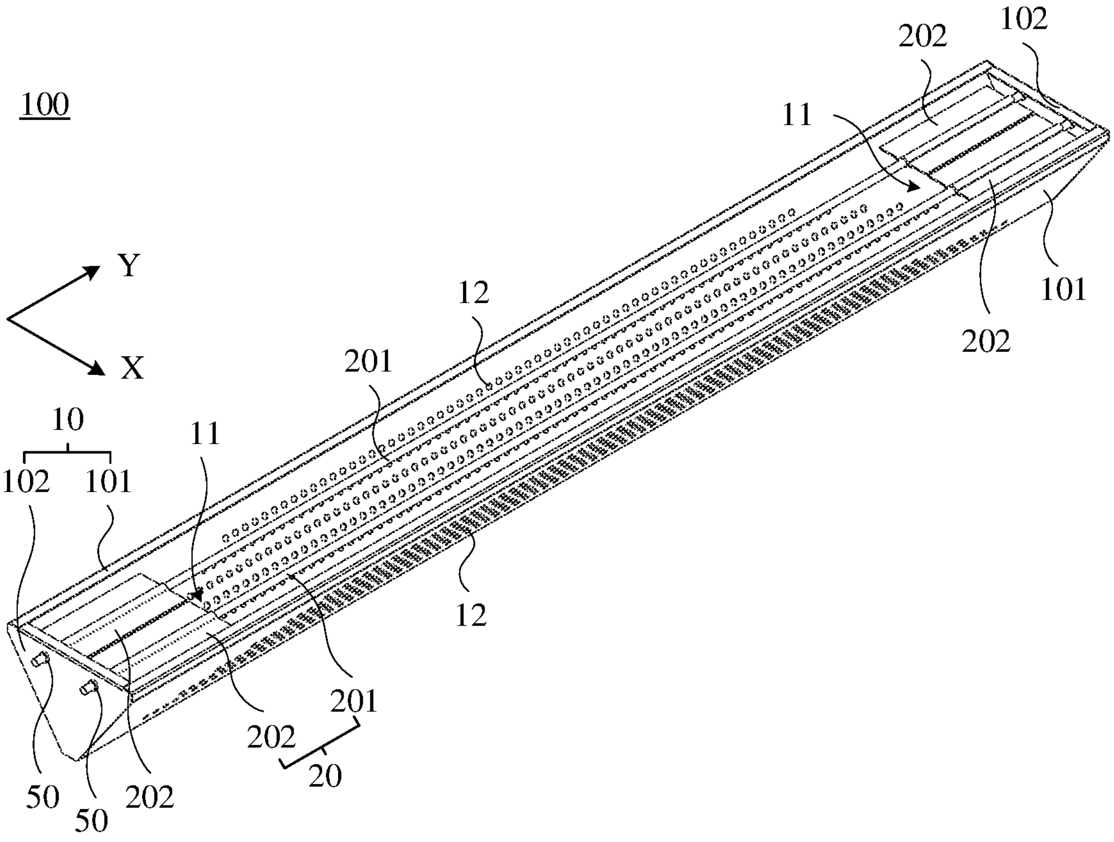
FIG. 1 is a schematic structural diagram of an air nozzle according to some embodiments of this application.

100. air nozzle;
10. housing;
20. regulation apparatus;
11. target air outlet;
12. air inlet;
101. side plate;
102. end plate;
103. connecting plate;
201. rotating rod;
202. blade;
30. connecting rod mechanism;
40. actuation mechanism;
401. actuator;
402. first connecting rod;
403. second connecting rod;
404. first steering gear;
405. second steering gear;
406. actuator base; and
50. spacer.

DETAILED DESCRIPTION

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms “include”, “comprise”, and “have” and any other variations thereof in the specification, claims and brief description of drawings of this application are intended to cover non-exclusive inclusions.

In the description of the embodiments of this application, the terms “first”, “second” and the like are merely intended to distinguish between different objects, and shall not be understood as any indication or implication of relative importance or any implicit indication of the number, sequence or primary-secondary relationship of the technical features indicated. In the description of this application, “multiple” means at least two unless otherwise specifically stated.

In this specification, reference to “embodiment” means that specific features, structures or characteristics described with reference to the embodiment may be incorporated in at least one embodiment of this application. The word “embodiment” appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term “and/or” is only an associative relationship for describing associated objects, indicating that three relationships may be present. For example, A and/or B may indicate the following three cases: presence of only A, presence of both A and B, and presence of only B. In addition, the character “/” in this specification generally indicates an “or” relationship between contextually associated objects.

In the description of the embodiments of this application, the term “multiple” means more than two (inclusive). Similarly, “multiple groups” means more than two (inclusive) groups, and “multiple pieces” means more than two (inclusive) pieces.

In the description of the embodiments of this application, the orientations or positional relationships indicated by the technical terms “center”, “longitudinal”, “transverse”, “length”, “width”, “thickness”, “upper”, “lower”, “front”, “rear”, “left”, “right”, “perpendicular”, “horizontal”, “top”, “bottom”, “inside”, “outside”, “clockwise”, “counterclockwise”, “axial”, “radial”, “circumferential”, and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms “mount”, “connect”, “join”, and “fasten” should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of market development, application of electric vehicle batteries is becoming more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

In the process of drying an electrode plate, a substrate coated with slurry is placed on a convey apparatus to go through an oven blowing hot air to make solvent in the slurry evaporate. The applicants have noticed that the drying speed varies in different regions of the electrode plate, seriously affecting the quality of the electrode plate.

Through research, the applicants have found that the oven in the related technology includes an air inlet chamber, an air return chamber, an air return channel, an air inlet nozzle, and an air exhaust nozzle. The air inlet and return chamber are arranged along a direction perpendicular to the surface of the electrode plate, and the air inlet chamber is located between the air return chamber and the electrode plate. The air inlet and exhaust nozzle are spaced apart along a direction parallel to a convey direction of the electrode plate, and both the air inlet and exhaust nozzles extend along a width direction of the electrode plate, both the air inlet and exhaust nozzles facing the surface of the electrode plate. The air inlet nozzle is connected to an outlet of the air inlet chamber, and the air exhaust nozzle is connected to an inlet of the air return chamber through the air return channels located on two sides of the electrode plate. Because the air exhaust nozzle is connected to the inlet of the air return chamber through the air return channels located on two sides of the electrode plate, the airflow on the two sides of the air exhaust nozzle is larger, and the drying speed on both sides of the electrode plate is larger than that in the middle part of the electrode plate. When the middle part of the electrode plate has been dried, cracks may have appeared on both sides of the electrode plate due to excessive drying, seriously affecting the quality of the electrode plate.

Out of the foregoing considerations, this application provides an air nozzle. The air nozzle includes a housing and an airflow regulation apparatus. The housing includes a target air outlet and an air inlet, where air flow enters the housing through the air inlet and leaves the housing through the target air outlet. The airflow regulation apparatus is located at the target air outlet and is capable of moving between at least a first position and a second position, where the airflow regulation apparatus exerts a greater resistance against the air flow in the first position than the airflow regulation apparatus exerts against the air flow in the second position. When the air nozzle is used as an air exhaust nozzle in an oven, the target air outlet is aligned to two sides of the electrode plate, and the airflow regulation apparatus is regulated to the first position to increase the resistance against the air flow at the target air outlet, thereby reducing the airflow on the two sides of the electrode plate. This can balance the drying speeds on both sides of the electrode plate and in the middle part of the electrode plate, alleviating the problem of inconsistent drying speeds and improving the quality of the electrode plate.

Embodiments of this application provide an air nozzle. FIG. 1 is a schematic structural diagram of the air nozzle according to some embodiments of this application. Referring to FIG. 1, the air nozzle 100 includes a housing 10 and an airflow regulation apparatus 20. The housing 10 includes a target air outlet 11 and an air inlet 12, where air flow enters the housing 10 through the air inlet 12 and leaves the housing 10 through the target air outlet 11. The airflow regulation apparatus 20 is located at the target air outlet 11 and is capable of moving between at least a first position and a second position, where the airflow regulation apparatus 20 exerts a greater resistance against the air flow in the first position than the airflow regulation apparatus 20 exerts against the air flow in the second position.

In this embodiment of this application, the housing 10 is not limited to a specific shape and material. The housing 10 has an air cavity, and the target air outlet 11 and the air inlet 12 both communicate with the air cavity. The target air outlet 11 is an air outlet at which the airflow needs to be regulated. When in use, the target air outlet 11 is aligned to a target region, where the target region is a region in which the airflow needs to be regulated.

The air nozzle 100 provided in this embodiment of this application may be an air inlet nozzle or an air exhaust nozzle.

In this embodiment of this application, the airflow regulation apparatus 20 in the first position exerts a greater resistance against the air flow in the first position than the airflow regulation apparatus 20 exerts against the air flow in the second position, that is, the airflow regulation apparatus 20 can obtain at least two airflows through regulation.

In other embodiments, the airflow regulation apparatus 20 can be fastened at any position between the first position and the second position, or at any position other than between the first position and the second position. The airflow regulation apparatus 20 fastened at different positions exerts different resistances on the air flow, allowing the airflow regulation apparatus 20 to regulate a wider range of airflow.

In this embodiment of this application, when the airflow at the target air outlet 11 needs to be reduced, the airflow regulation apparatus 20 is regulated to the first position to increase the resistance against the air flow at the target air outlet 11, thereby reducing the airflow at the target air outlet 11. When the airflow at the target air outlet 11 needs to be increased, the airflow regulation apparatus 20 is regulated to the second position to reduce the resistance against the air flow at the target air outlet 11, thereby increasing the airflow at the target air outlet 11. When the air nozzle 100 provided in this embodiment of this application is used as an exhaust air nozzle in the oven, the target air outlet 11 is aligned to two sides of the electrode plate, and the airflow regulation apparatus 20 is regulated to the first position, thereby reducing the airflow on the two sides of the electrode plate. This can balance the drying speeds on both sides of the electrode plate and in the middle part of the electrode plate, alleviating the problem of inconsistent drying speeds and improving the quality of the electrode plate.

According to some embodiments of this application, referring to FIG. 1, the airflow regulation apparatus 20 includes a rotating rod 201 and a blade 202. The rotating rod 201 is rotatably connected to the housing 10, and the blade 202 is located at the target air outlet 11. The blade 202 is connected to the rotating rod 201, and the rotating rod 201 can drive the blade 202 to rotate.

In this embodiment of this application, the rotating rod 201 is rotatable, and the blade 202 is connected to the rotating rod 201. Therefore, when the rotating rod 201 rotates, it can drive the blade 202 to rotate.

For example, a middle part of the blade 202 is connected to the rotating rod 201, or an end of the blade 202 is connected to the rotating rod 201.

In this embodiment of this application, when the rotating rod 201 rotates, it drives the blade 202 to rotate, to change the area of the blade 202 blocking the target air outlet 11, thereby changing the resistance exerted to the air flow and implementing airflow regulation. The airflow can be regulated simply by controlling the rotating rod 201 to rotate, featuring simple structure and easy regulation. In addition, the rotating rod 201 can be regulated to rotate at different angles, so that the area of the blade 202 blocking the target air outlet 11 varies, allowing the airflow regulation apparatus 20 to regulate a wider range of airflow.

According to some embodiments of this application, the airflow regulation apparatus 20 includes at least two rotating rods 201 parallel to each other, and each of the rotating rods 201 is connected to at least one blade 202.

For example, the angles of rotation of multiple rotating rods 201 may be the same or different, and the blocking area of multiple blades 202 connected to the same rotating rod 201 for the target air outlet 11 may be the same or different.

For example, the airflow regulation apparatus 20 includes two rotating rods 201 parallel to each other, and the numbers of blades 202 connected to different rotating rods 201 may be the same or different. For example, each rotating rod 201 is connected to two blades 202, and the two blades 202 are arranged along a length direction of the rotating rod 201.

In this embodiment of this application, positions of the rotating rod 201 and the blades 202 can be determined based on the position of the target air outlet 11, so that even if there are multiple target air outlets 11, it is possible to implement airflow regulation at the multiple target air outlets 11.

Figure 2:
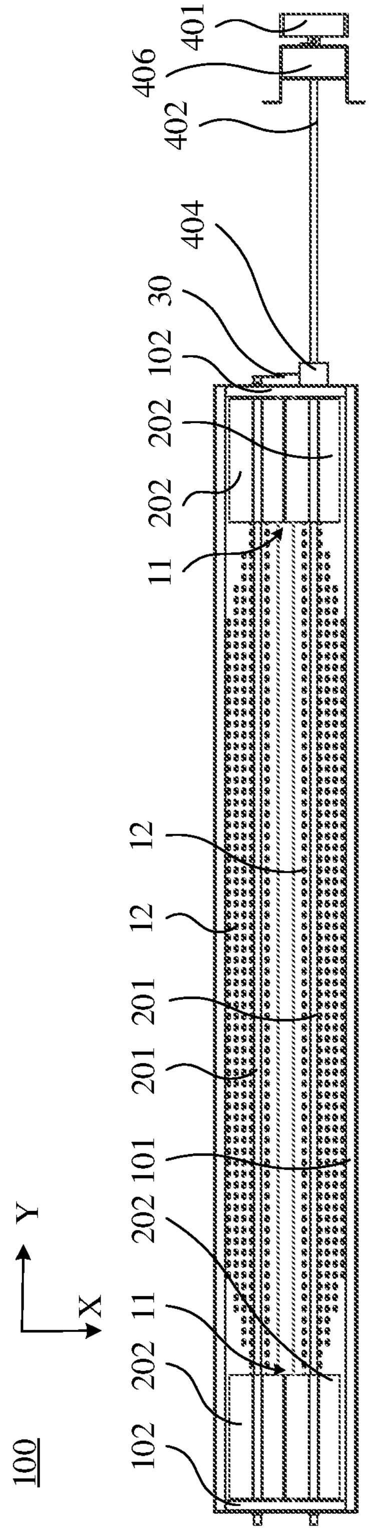
FIG. 2 is a top view of an air nozzle according to some embodiments of this application.
Figure 3:
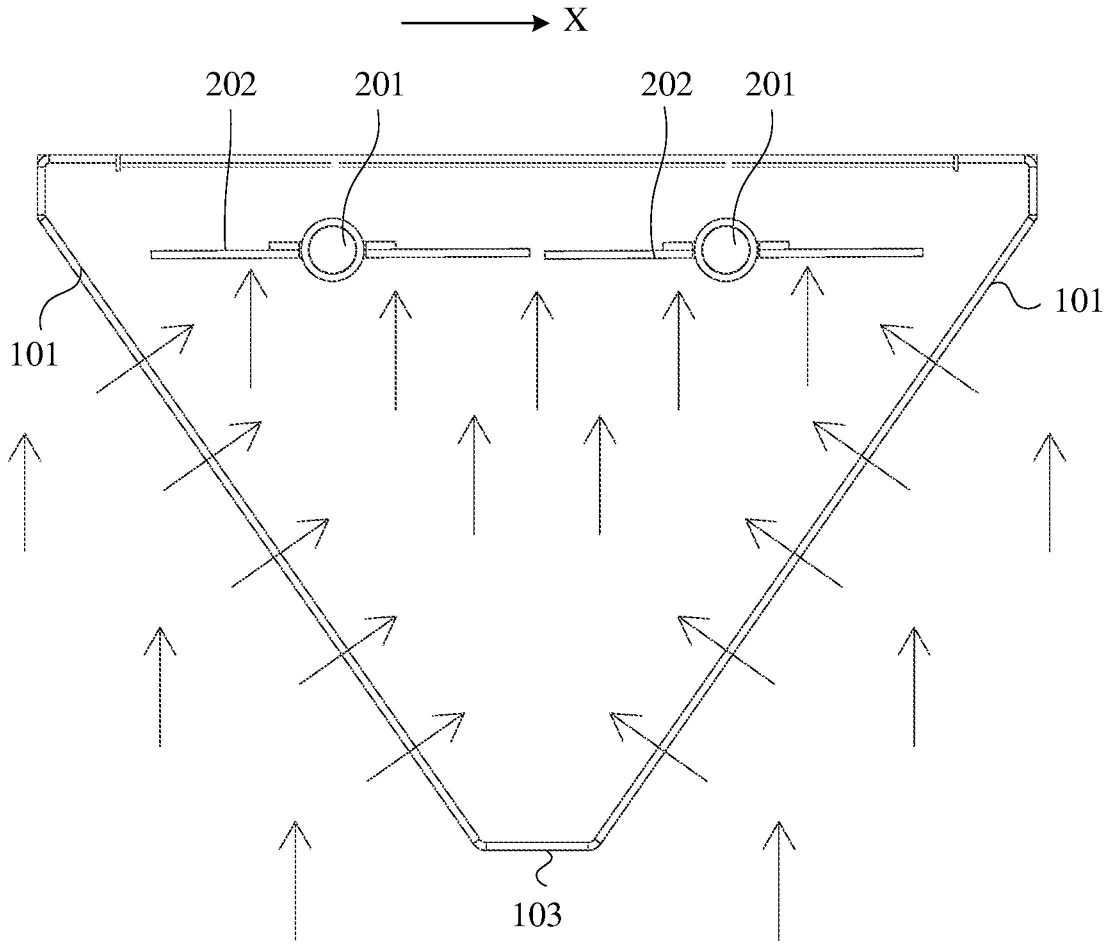
FIG. 3 is a left view of an air nozzle according to some embodiments of this application.
Figure 4:
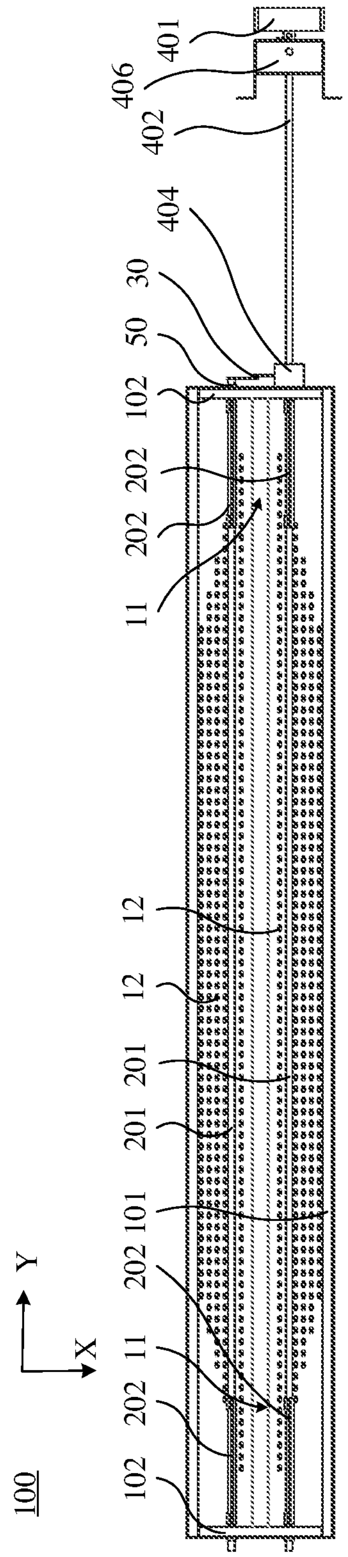
FIG. 4 is a top view of an air nozzle in another state according to some embodiments of this application.
Figure 5:
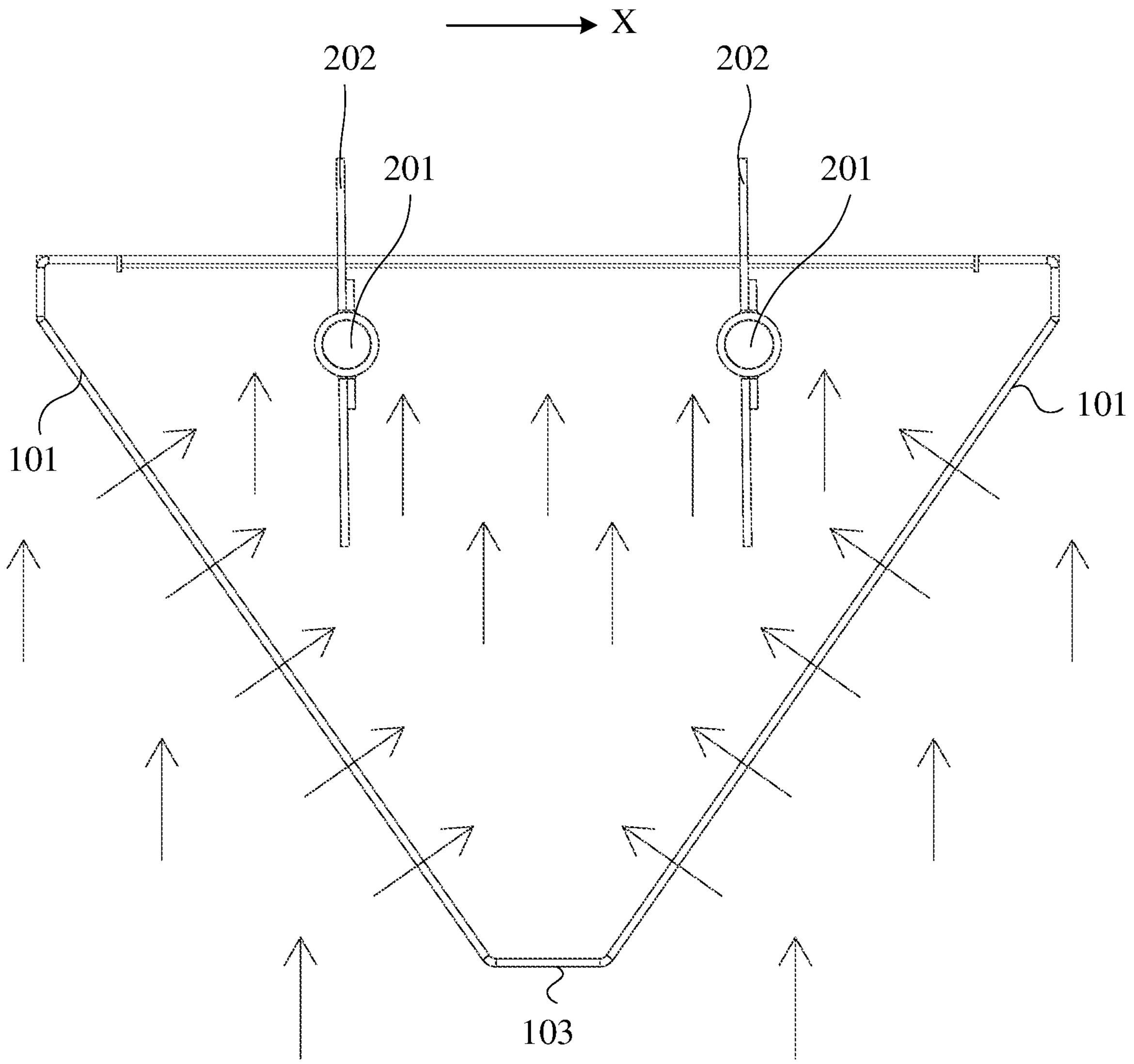
FIG. 5 is a left view of an air nozzle in another state according to some embodiments of this application.

FIG. 2 is a top view of an air nozzle according to some embodiments of this application. FIG. 3 is a left view of an air nozzle according to some embodiments of this application. FIG. 4 is a top view of an air nozzle in another state according to some embodiments of this application. FIG. 5 is a left view of an air nozzle in another state according to some embodiments of this application. The airflow regulation apparatus 20 shown in FIG. 2 and FIG. 3 is fastened at the first position. In this case, the blade 202 is parallel to a width direction X of the housing 10, which maximizes its blocking on the target air outlet 11 and minimizes the airflow at the target air outlet 11. The airflow regulation apparatus 20 shown in FIG. 4 and FIG. 5 is fastened at the second position. In this case, the blade 202 is perpendicular to a width direction X of the housing 10, which minimizes its blocking on the target air outlet 11 and maximizes the airflow at the target air outlet 11. The arrows in FIG. 3 and FIG. 5 indicate the directions of air flow.

In this embodiment of this application, in the air nozzle 100 shown in FIG. 2 to FIG. 5, the airflow regulation apparatus 20 may alternatively be fastened at any position between the first position and the second position.

Figure 6:
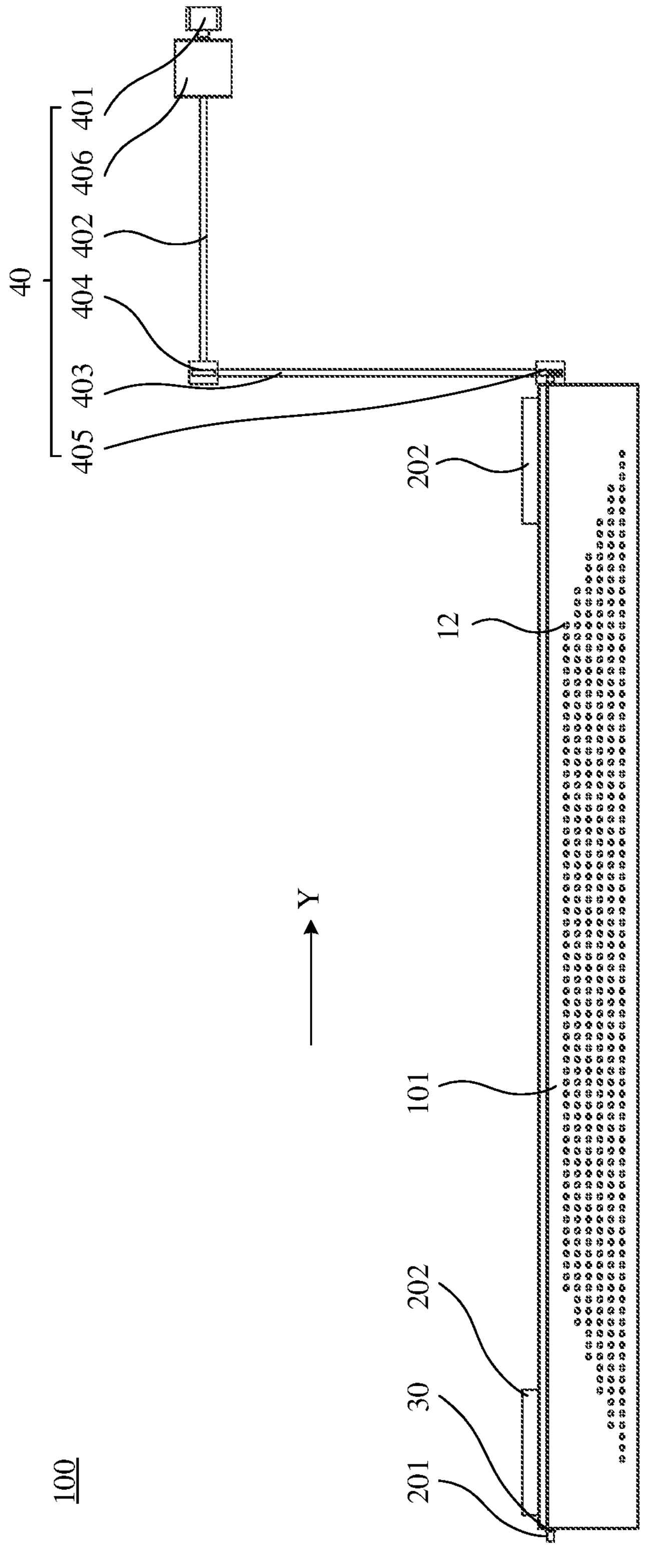
FIG. 6 is a main view of an air nozzle according to some embodiments of this application.

According to some embodiments of this application, the airflow regulation apparatus 20 includes two rotating rods 201, where the two rotating rods 201 are arranged along the width direction X of the housing 10. FIG. 6 is a main view of an air nozzle according to some embodiments of this application. Referring to FIG. 6, the air nozzle 100 further includes a connecting rod mechanism 30, and two ends of the connecting rod mechanism 30 are each fixedly connected to one rotating rod 201.

For example, both rotating rods 201 extend in a length direction Y of the housing 10.

For example, the connecting rod mechanism 30 may be a double-crank connecting rod.

In this embodiment of this application, with the connecting rod mechanism 30 provided, two rotating rods 201 can be rotated simultaneously, so that only one rotating rod 201 needs to be rotated to implement simultaneous rotation of the two rotating rods 201, which is more labor-saving.

In this embodiment of this application, the rotation angles of the two rotating rods 201 can be controlled to be the same or different by changing the structure of the connecting rod mechanism 30.

For example, when the connecting rod mechanism 30 is an unequal-length double-crank mechanism, the rotation angles of the two rotating rods 201 are different; when the connecting rod mechanism 30 is an equal-length double-crank mechanism, the rotation angles of the two rotating rods 201 are the same.

In this embodiment of this application, the two rotating rods 201 can be controlled to rotate in the same direction or in opposite directions by changing the structure of the connecting rod mechanism 30.

For example, the connecting rod mechanism 30 can be a parallel double-crank mechanism, and in this case, the two rotating rods 201 rotate in the same direction. Alternatively, the connecting rod mechanism 30 can be an anti-parallel double-crank mechanism, and in this case, the two rotating rods 201 rotate in opposite directions.

According to some embodiments of this application, referring to FIG. 6, the air nozzle 100 further includes an actuation mechanism 40, where the actuation mechanism 40 is connected to the rotating rod 201.

In this embodiment of this application, the actuation mechanism 40 may be electrically actuated or manually actuated.

In this embodiment of this application, the actuation mechanism 40 is used to actuate the rotating rod 201 to rotate, which is more labor-saving. The rotating rod 201 can also be fastened by fastening the actuation mechanism 40. When the rotating rod 201 is regulated to a specified position at which the rotating rod 201 is unable to rotate, the rotating rod 201 is fastened.

According to some embodiments of this application, referring to FIG. 6, the actuation mechanism 40 includes an actuator 401, a first connecting rod 402, a second connecting rod 403, a first steering gear 404, and a second steering gear 405. The first connecting rod 402 extends in a first direction, where the first connecting rod 402 is connected to an actuating shaft of the actuator 401, and the first direction is parallel to an extension direction of the rotating rod 201. The second connecting rod 403 extends in a second direction, where the second direction intersects with the first direction. The first steering gear 404 is connected to the first connecting rod 402 and the second connecting rod 403, and the second steering gear 405 is connected to the second connecting rod 403 and the rotating rod 201.

In this embodiment of this application, the first direction is parallel to the length direction Y of the housing 10, and the second direction is perpendicular to the first direction.

Because the first connecting rod 402 is perpendicular to the second connecting rod 403, and the second connecting rod 403 is perpendicular to the rotating rod 201, the first connecting rod 402 and the rotating rod 201 rotate in the same direction, and the first connecting rod 402 and the second connecting rod 403 rotate in different directions. The rotation of the first connecting rod 402 is transmitted to the second connecting rod 403 via the first steering gear 404, enabling the second connecting rod 403 to rotate around its central axis. The rotation of the second connecting rod 403 is transmitted to the rotating rod 201 via the second steering gear 405, enabling the rotating rod 201 to rotate around its central axis.

In this embodiment of this application, the actuator 401 actuates the first connecting rod 402 to rotate, the first connecting rod 402 drives, via the first steering gear 404, the second connecting rod 403 to rotate, and the second connecting rod 403 drives, via the second steering gear 405, the rotating rod 201 to rotate, so that the blade 202 rotates to regulate the airflow at the target air outlet 11.

For example, the actuator 401 is an electric actuator. The electric actuator can be controlled by a controller.

Referring to FIG. 6, the actuation mechanism 40 includes an actuator base 406, and the actuator base 406 is configured for mounting the actuator 401 to ensure stability of the actuator 401.

In this embodiment of this application, both the connecting rod mechanism 30 and the actuation mechanism 40 are located outside the housing 10, meaning that the control of the airflow regulation apparatus 20 is transmitted to outside the housing 10, making the regulation more convenient.

According to some embodiments of this application, the rotating rod 201 extends in the length direction Y of the housing 10, and the blade 202 is slidably connected to the rotating rod 201, where a sliding direction of the blade 202 is parallel to the length direction Y of the housing 10.

Figure 7:
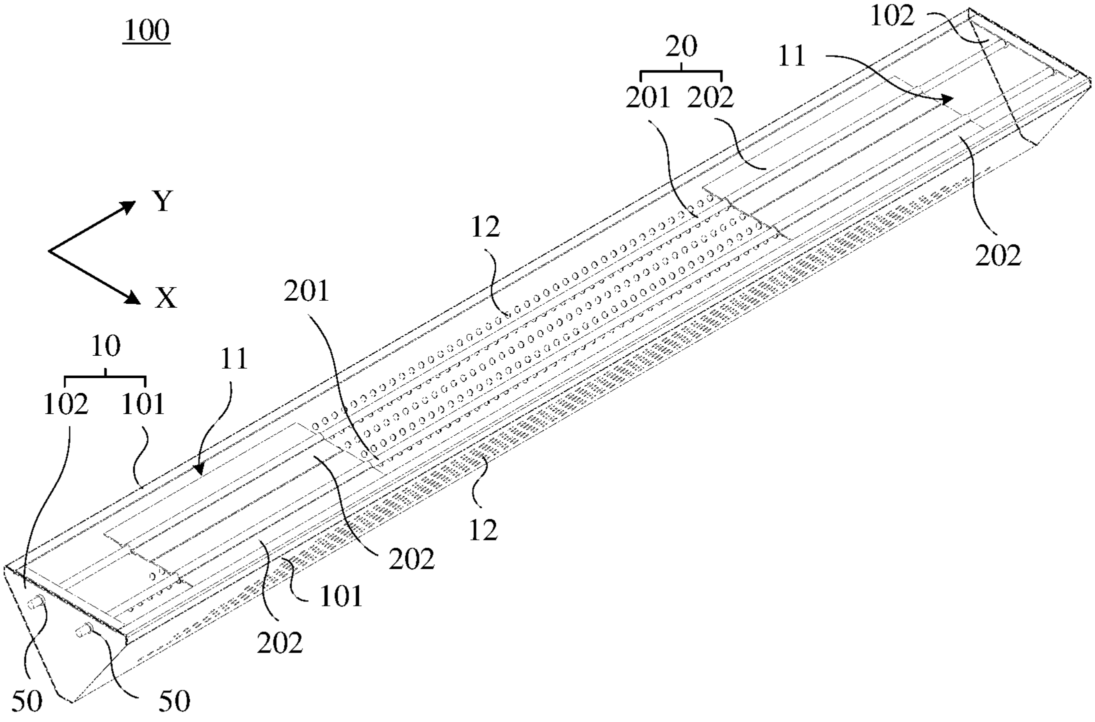
FIG. 7 is a schematic structural diagram of another air nozzle according to some embodiments of this application.

FIG. 7 is a schematic structural diagram of another air nozzle according to some embodiments of this application. Referring to FIG. 1 and FIG. 7, the blade 202 of the air nozzle 100 shown in FIG. 7 moves toward the middle of the housing.

For example, two ends of the rotating rod 201 are cylindrical in shape, ensuring that the rotating rod 201 is able to rotate. The middle part of the rotating rod 201 is rectangular in shape, and the blade 202 is fitted around the middle part of the rotating rod 201. In this way, the blade 202 can rotate with the rotating rod 201, and the blade 202 can also slide on the rotating rod 201.

In this embodiment of this application, the position of the blade 202 is adjusted by sliding the blade 202. The position of the blade 202 can be adjusted based on the position of the target air outlet 11, so as to regulate the airflow at different target air outlets 11.

According to some embodiments of this application, referring to FIG. 1, FIG. 2, FIG. 4, FIG. 6, and FIG. 7, in the length direction Y of the housing 10, the target air outlet 11 is located at both ends of the housing 10.

When the air nozzle 100 provided in the embodiment of this application is used in an oven for electrode plate, the air nozzle 100 is arranged along a width direction of the electrode plate, and two ends of the air nozzle 100 correspond to two sides of the electrode plate. Due to the faster drying speed on both sides of the electrode plate, the target air outlet 11 is located at the two ends of the housing 10, meaning that the target air outlet 11 corresponds to both sides of the electrode plate. The airflow regulation apparatus 20 is used to regulate the airflow at the target air outlet 11, so as to reduce the drying speed at the target air outlet 11 and balance the drying speeds on both sides of the electrode plate and in the middle part of the electrode plate, thereby reducing the deviation in drying speed and improving the quality of the electrode plate.

According to some embodiments of this application, referring to FIG. 1 and FIG. 7, the housing 10 includes two side plates 101 and two end plates 102. The two end plates 102 are respectively located at two ends of the two side plates 101, where the two end plates 102 are both connected to the two side plates 101, and for each of the side plates 101, two ends of the side plate 101 are connected to different end plates 102.

In this embodiment of this application, the two side plates 101 may be provided in parallel, and the surfaces of the two side plates 101 are opposite each other, or planes on which the surfaces of the two side plates 101 are located intersect.

In one embodiment of this application, the two side plates 101 and the two end plates 102 form an air cavity of the housing 10, and the air cavity has two openings, where one of the openings may be an air outlet, the air outlet including a target air outlet, and the other opening may be an air inlet.

In another embodiment of this application, the two side plates 101 and the two end plates 102 form an air cavity of the housing 10, and two openings of the air cavity are each closed by a connecting plate. An air outlet is arranged on one of the connecting plates, the air outlet including a target air outlet, and an air inlet is arranged on the other connecting plate.

In this embodiment of this application, the side plate 101 and the end plate 102 may be metal plates, and the side plate 101 and the end plate 102 may be connected by welding.

The two ends of the rotating rod 201 are rotatably connected to the two end plates 102, respectively.

In this embodiment of this application, a spacer 50 is arranged at the joint of the rotating rod 201 and the end plate 102 to reduce friction between the rotating rod 201 and the end plate 102.

For example, the spacer 50 may be a Teflon gasket.

In this embodiment of this application, the two side plates 101 and the two end plates 102 form an overall structure of the housing 10 and are combined to form the air cavity of the housing 10.

According to some embodiments of this application, referring to FIG. 1 and FIG. 7, the end plate 102 is trapezoidal in shape and the two side plates 101 are respectively connected to two waists of the end plate 102.

In some other embodiments, the end plate 102 is rectangular in shape, and the two side plates 101 are respectively connected to two opposite side walls of the end plate 102.

In this embodiment of this application, the end plate 102 is arranged to be trapezoidal in shape, and the size of the target air outlet 11 can be adjusted by adjusting the shape of the trapezoid, without changing the size of the air inlet.

According to some embodiments of this application, referring to FIG. 1, FIG. 2, FIG. 4, FIG. 6, and FIG. 7, the air inlet 12 is located on the two side plates 101.

Referring to FIG. 3 and FIG. 5, one of the side walls of the two side plates 101 is connected via the connecting plate 103.

For example, the air inlet 12 may alternatively be located on the connecting plate 103.

In this embodiment of this application, an area of the side plate 101 is so large that a large number of air inlets 12 can be arranged to improve the overall drying speed of the oven.

According to some embodiments of this application, referring to FIG. 1, FIG. 2, FIG. 4, FIG. 6, and FIG. 7, both side plates 101 are provided with multiple air inlets 12. For each side plate 101, along an arrangement direction of the two end plates 102, the number of air inlets 12 in a middle part of the side plate 101 is larger than the number of air inlets 12 at either end of the side plate 101.

In this embodiment of this application, the two end plates 102 are arranged along the length direction Y of the housing 10.

Referring to FIG. 2, FIG. 4 and FIG. 6, the air inlets 12 are arranged in an isosceles trapezoid shape.

In this embodiment of this application, because the target air outlet 11 is located at the two ends of the housing 10, reducing the number of air inlets 12 at two ends of the side plate 101 can also reduce the airflow at the target air outlet 11.

The embodiments of this application further provide an oven including the air nozzle 100 in the foregoing embodiments.

The oven provided in this embodiment of this application can be used to dry electrode plates.

In this embodiment of this application, the oven discharges the evaporated solvent (gaseous NMP from the cathode and water vapor from the anode) from the oven through a duct and an air exhaust nozzle, and sends fresh air into the oven through a fresh air duct and an air outlet nozzle to implement a drying cycle.

The oven provided in this embodiment of this application can reduce the drying speed on both sides of the electrode plate, so as to achieve a balance with the drying speed in the middle part of the electrode plate, thereby alleviating the problem of inconsistent drying speeds and improving the quality of the electrode plate.

The embodiments of this application provide a coating system including the oven in the foregoing embodiment.

This embodiment of this application provides an exhaust air nozzle, where the exhaust air nozzle includes a housing 10, an airflow regulation apparatus 20, a connecting rod mechanism 30, an actuation mechanism 40, and a spacer 50.

The housing 10 includes a target air outlet 11 and an air inlet 12. Air flow enters the housing 10 through the air inlet 12 and leaves the housing 10 through the target air outlet 11. The housing 10 includes two side plates 101 and two end plates 102. The two end plates 102 are respectively located at two ends of the two side plates 101, where the two end plates 102 are both connected to the two side plates 101, and for each of the side plates 101, two ends of the side plate 101 are connected to different end plates 102. The two side plates 101 and two end plates 102 form an air cavity, and one opening of the air cavity is closed via a connecting plate 103. The other opening of the air cavity is an air outlet, where the air outlet includes a target air outlet 11, and the target air outlet 11 is located at both ends of the housing 10. The air inlet 12 is located on the two side plates 101. For each side plate 101, along a length direction Y of the housing 10, the number of air inlets 12 in a middle part of the side plate 101 is larger than the number of air inlets 12 at either end of the side plate 101.

The airflow regulation apparatus 20 includes two rotating rods 201 and a blade 202. Two ends of the rotating rod 201 are rotatably connected to the two end plates 102, respectively. Two blades 202 are fitted around one rotating rod 201, and the rotating rod 201 can drive the blades 202 to rotate. The blades 202 are located at the target air outlet 11.

A spacer 50 is provided at the joint of the rotating rod 201 and the end plate 102.

Two ends of the connecting rod mechanism 30 are respectively connected to the two rotating rods 201.

The actuation mechanism 40 includes an actuator 401, a first connecting rod 402, a second connecting rod 403, a first steering gear 404, and a second steering gear 405. The first connecting rod 402 extends in a length direction Y of the housing, the first connecting rod 402 is connected to an actuating shaft of the actuator 401, and the second connecting rod 403 is perpendicular to the first connecting rod 402. The first steering gear 404 is connected to the first connecting rod 402 and the second connecting rod 403, and the second steering gear 405 is connected to the second connecting rod 403 and the rotating rod 201.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. An air nozzle, comprising:

a housing; and an airflow regulator;

wherein the housing comprises a target air outlet, two side plates, and two end plates, the two end plates are respectively located at two ends of the two side plates, the two end plates are both connected to the two side plates, and for each of the side plates, two ends of a side plate are connected to different end plates;

wherein the two side plates are each provided with multiple air inlets, an air flow enters the housing through the air inlets and leaves the housing through the target air outlet;

wherein the airflow regulator is located at the target air outlet and capable of moving between a first position and a second position;

wherein the airflow regulator exerts a greater resistance against the air flow in the first position than the airflow regulator exerts against the air flow in the second position; and wherein for each of the side plates, along an arrangement direction of the two end plates, the number of air inlets in a middle part of the side plate is larger than the number of air inlets at either end of the side plate.

2. The air nozzle according to claim 1, wherein the airflow regulator comprises:

a rotating rod rotatably connected to the housing; and a blade located at the target air outlet;

wherein the blade is connected to the rotating rod, and the rotating rod is able to drive the blade to rotate.

3. The air nozzle according to claim 2, wherein the airflow regulator comprises at least two rotating rods parallel to each other, and each of the rotating rods is connected to at least one blade.

4. The air nozzle according to claim 2, wherein the airflow regulator comprises two rotating rods, the two rotating rods being arranged along a width direction X of the housing; and wherein the air nozzle further comprises:

a connecting rod, wherein two ends of the connecting rod are each fixedly connected to one rotating rod.

5. The air nozzle according to claim 2, wherein the nozzle further comprises:

an actuator assembly connected to the rotating rod.

6. The air nozzle according to claim 5, wherein the actuator assembly comprises:

an actuator;

a first connecting rod extending in a first direction, wherein the first connecting rod is connected to an actuating shaft of the actuator, and the first direction is parallel to an extension direction of the rotating rod;

a second connecting rod extending in a second direction, wherein the second direction intersects with the first direction;

a first steering gear connected to the first connecting rod and the second connecting rod; and a second steering gear connected to the second connecting rod and the rotating rod.

7. The air nozzle according to claim 2, wherein the rotating rod extends along a length direction Y of the housing, the blade is slidably connected to the rotating rod, and a sliding direction of the blade is parallel to the length direction Y of the housing.

8. The air nozzle according to claim 1, wherein the target air outlet is located at both ends of the housing along a length direction Y of the housing.

9. The air nozzle according to claim 1, wherein the two end plates are trapezoidal in shape, and the two side plates are respectively connected to two waists of the two end plates.

10. The air nozzle according to claim 1, wherein the air inlet is located on the two side plates.

11. An oven, comprising the air nozzle according to claim 1.

12. A coating system, comprising the oven according to claim 11.

* * * * *